(12) United States Patent
Choe

(10) Patent No.: US 8,982,510 B2
(45) Date of Patent: Mar. 17, 2015

(54) PERPENDICULAR MAGNETIC RECORDING DISK HAVING A PERMEABILITY GRADIENT

(75) Inventor: Gunn Choe, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 2095 days.

(21) Appl. No.: 11/935,189

(22) Filed: Nov. 5, 2007

(65) Prior Publication Data

US 2009/0116147 A1  May 7, 2009

(51) Int. Cl.
*G11B 5/82* (2006.01)
*G11B 5/667* (2006.01)
*G11B 5/73* (2006.01)

(52) U.S. Cl.
CPC *G11B 5/82* (2013.01); *G11B 5/667* (2013.01); *G11B 5/7325* (2013.01)
USPC .......................................... 360/135

(58) Field of Classification Search
USPC .................................... 360/135; 428/827–833
See application file for complete search history.

(56) References Cited

U.S. PATENT DOCUMENTS

| | | | |
|---|---|---|---|
| 3,516,860 A | 6/1970 | Simmons | |
| 4,426,265 A | 1/1984 | Brunsch et al. | |
| 4,588,653 A | 5/1986 | Wray | |
| 6,641,935 B1 | 11/2003 | Li et al. | |
| 6,660,357 B1 | 12/2003 | Litvinov et al. | |
| 6,808,783 B1 | 10/2004 | Lin et al. | |
| 6,818,330 B2 | 11/2004 | Shukh et al. | |
| 6,835,475 B2 | 12/2004 | Carey et al. | |
| 7,153,596 B2 | 12/2006 | Tanahashi et al. | |
| 2005/0244679 A1 | 11/2005 | Arai et al. | |

FOREIGN PATENT DOCUMENTS

| | | |
|---|---|---|
| JP | 58085933 | 5/1983 |
| JP | 61194623 | 8/1986 |
| JP | 2240827 | 9/1990 |
| JP | 3025718 | 2/1991 |
| JP | 6103553 | 4/1994 |
| JP | 6180834 | 6/1994 |
| JP | 2002150544 | 5/2002 |

OTHER PUBLICATIONS

Machine Translation of Matsuyama et al. JP 2002-150544 A, Publication Date May 24, 2002.*

(Continued)

*Primary Examiner* — Joseph Feild
*Assistant Examiner* — Gustavo Polo
(74) *Attorney, Agent, or Firm* — Duft Bornsen & Fettig LLP

(57) ABSTRACT

Perpendicular magnetic recording disks and methods of fabricating perpendicular magnetic recording disks are described. The perpendicular magnetic recording disk includes a soft magnetic underlayer (SUL) structure, an interlayer, and a perpendicular magnetic recording layer. The SUL structure has an increased permeability from an inner radius of the disk to an outer radius of the disk. As a result, the magnetic write width (MWW) on the tracks of the disk is substantially uniform throughout the disk.

25 Claims, 5 Drawing Sheets

(56) References Cited

OTHER PUBLICATIONS

Tanahashi, K, et al., "Exchange-Biased Soft Underlayers for Perpendicular Recording", IEEE Transactions on Magnetics, vol. 41, No. 2, pp. 577-580 (Feb. 2005).

Acharya, B. R., et al., "Anti-Parallel Coupled Soft Under Layers for High-Density Perpendicular Recording", IEEE Transactions on Magnetics, vol. 40, No. 4, pp. 2383-2385 (Jul. 2004).

* cited by examiner

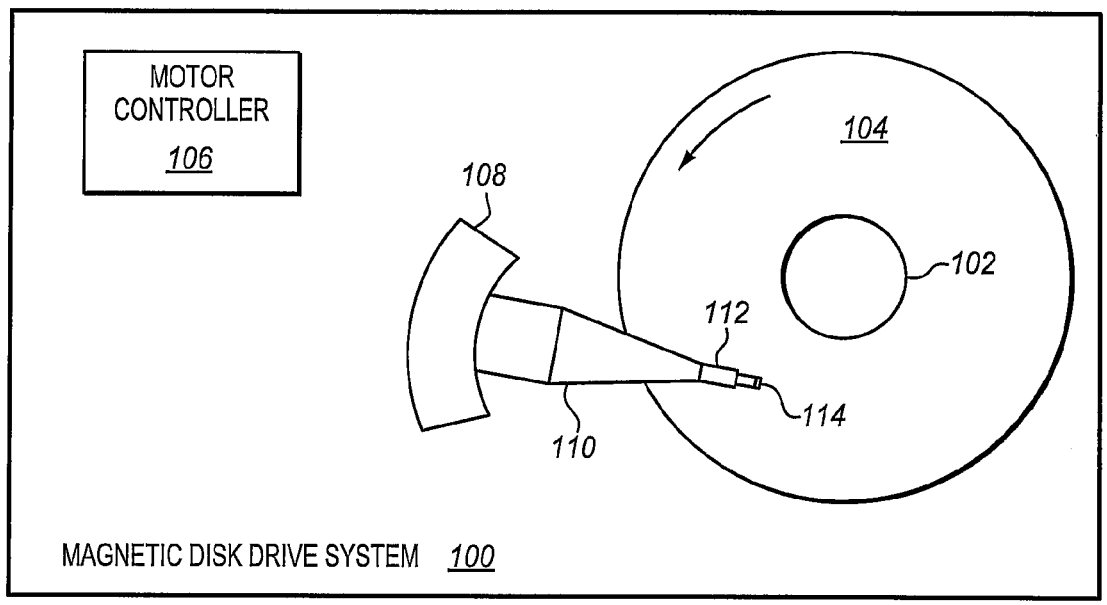
FIG. 1
FIG. 2
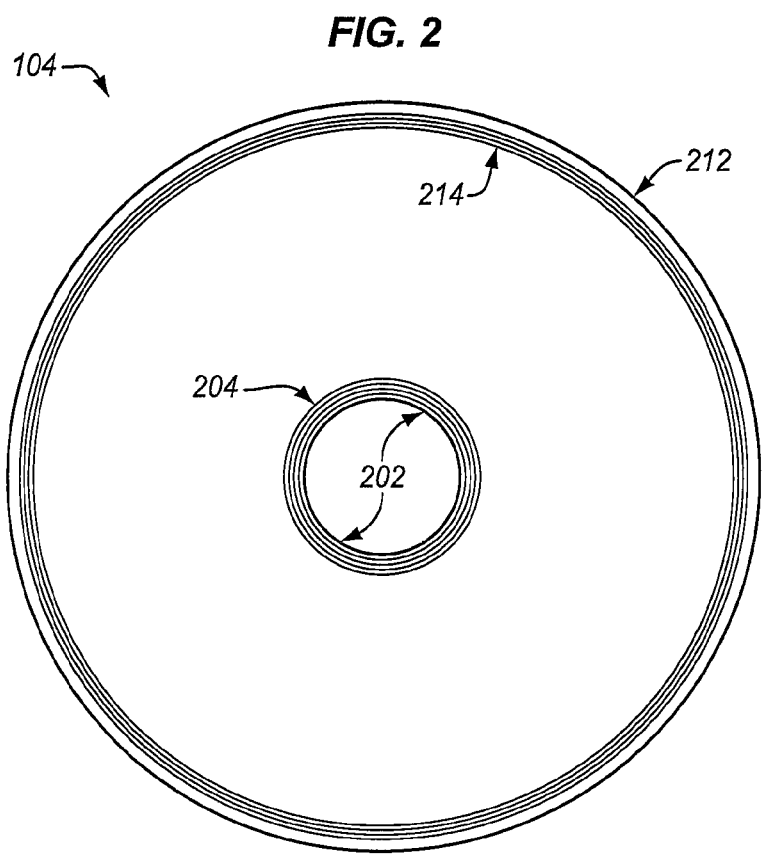

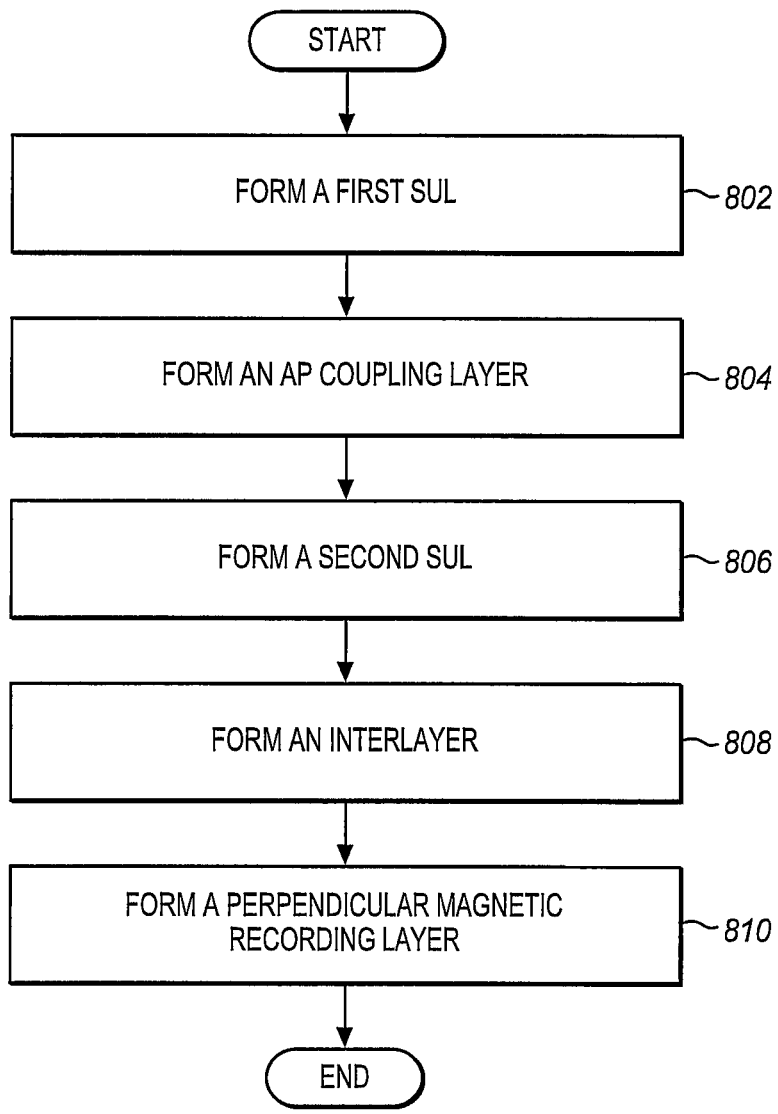

PERPENDICULAR MAGNETIC RECORDING DISK HAVING A PERMEABILITY GRADIENT

BACKGROUND OF THE INVENTION

1. Field of the Invention

The invention is related to the field of magnetic disk drive systems and, in particular, to a perpendicular magnetic recording disk having a permeability gradient. More particularly, the perpendicular magnetic recording disk is formed such that a soft magnetic underlayer (SUL) structure in the disk is formed in a way that the permeability of the SUL structure increases from an inner radius of the disk to an outer radius of the disk.

2. Statement of the Problem

One type of recording medium presently used in magnetic recording/reproducing apparatuses is a longitudinal magnetic recording medium. A longitudinal magnetic recording medium includes a magnetic recording layer having an easy axis of magnetization parallel to the substrate. The easy axis of magnetization is the crystalline axis that is aligned along the lowest energy direction for the magnetic moment. Another type of recording medium is a perpendicular magnetic recording medium. A perpendicular magnetic recording medium includes a magnetic recording layer having an easy axis of magnetization oriented substantially perpendicular to the substrate.

The perpendicular magnetic recording medium is generally formed with a substrate, a soft magnetic underlayer (SUL), an interlayer, a perpendicular magnetic recording layer, and a protective layer for protecting the surface of the perpendicular magnetic recording layer. The soft magnetic underlayer (SUL) serves to concentrate a magnetic flux emitted from a main pole of a write head and to serve as a flux return path back to a return pole of the write head during recording on the magnetic recording layer. The interlayer serves to control the size of magnetic crystal grains and the orientation of the magnetic crystal grains in the magnetic recording layer. The interlayer also serves to magnetically de-couple the SUL and the magnetic recording layer.

Perpendicular magnetic recording media is typically in the form of a circular disk having concentric circular tracks for storing data. Disk drive manufacturers strive to achieve higher and higher areal densities on the disk. To achieve the higher areal densities, track densities and the linear densities of the disks are increased. As track density increases, it becomes important to control the track width precisely. A precisely-controlled track width depends on the magnetic write width (MWW) that can be achieved on the disk, which is the width of bits in the radial direction.

It is a problem to maintain a uniform MWW at different radii of the disk. The MWW of a perpendicular magnetic recording disk is a function of the data recording frequency. The data recording frequencies for writing to a perpendicular magnetic recording disk vary depending on the circumference of the track in an attempt to have a uniform linear density throughout the disk. For instance, the tracks closer to the outer radius of the disk are written with higher recording frequencies (i.e., higher data rates) than the tracks closer to the center of the disk so that the tracks have a substantially similar linear density. However, the MWW of the bits becomes smaller at higher recording frequencies, which makes the MWW larger for the inner tracks (i.e., lower data rates) as compared to the outer tracks (i.e., higher data rates). It would be desirable to fabricate perpendicular magnetic recording disks that allow for a substantially uniform MWW throughout the disk.

SUMMARY OF THE SOLUTION

Embodiments of the invention solve the above and other related problems with an SUL in the perpendicular magnetic recording disk that has a permeability gradient from the inner radius of the disk to the outer radius. By changing the permeability of the SUL from the inner radius to the outer radius, the MWW of the bits remains substantially uniform for different data recording frequencies. Thus, the MWW of the inner tracks of the disk are substantially similar to the MWW of the outer tracks of the disk even though the outer tracks are written with a higher data recording frequency than the inner tracks. The perpendicular magnetic recording disk as described herein advantageously has uniform track width at different radii. Thus, higher density recording may be achieved on the disks.

One embodiment of the invention comprises a perpendicular magnetic recording disk that includes a SUL that is an antiparallel (AP) coupled SUL structure, an interlayer, and a perpendicular magnetic recording layer. The AP coupled SUL structure has an increased permeability from an inner radius of the disk to an outer radius of the disk. As a result, the MWW of the tracks of the disk are substantially uniform throughout the disk.

In another embodiment, the AP coupled SUL structure includes a first SUL, an AP coupling layer, and a second SUL. To achieve the increased permeability from an inner radius of the disk to an outer radius of the disk, the thicknesses of the first SUL and the second SUL increase from the inner radius to the outer radius. The increased thicknesses decrease the AP exchange field between the first SUL and the second SUL from the inner radius to the outer radius resulting in an increased permeability.

In another embodiment, to achieve the increased permeability from the inner radius of the disk to the outer radius of the disk, the thickness of the AP coupling layer increases from the inner radius to the outer radius. The increased thickness of the AP coupling layer decreases the AP exchange field between the first SUL and the second SUL from the inner radius to the outer radius resulting in an increased permeability.

The invention may include other exemplary embodiments described below.

DESCRIPTION OF THE DRAWINGS

The same reference number represents the same element or same type of element on all drawings.

FIG. 1 illustrates a magnetic disk drive system in an exemplary embodiment of the invention.

FIG. 2 is a top view of a perpendicular magnetic recording disk in an exemplary embodiment of the invention.

FIG. 8 is a flow chart illustrating a method of fabricating a perpendicular magnetic recording disk in an exemplary embodiment of the invention.

DETAILED DESCRIPTION OF THE INVENTION

Figure 3:
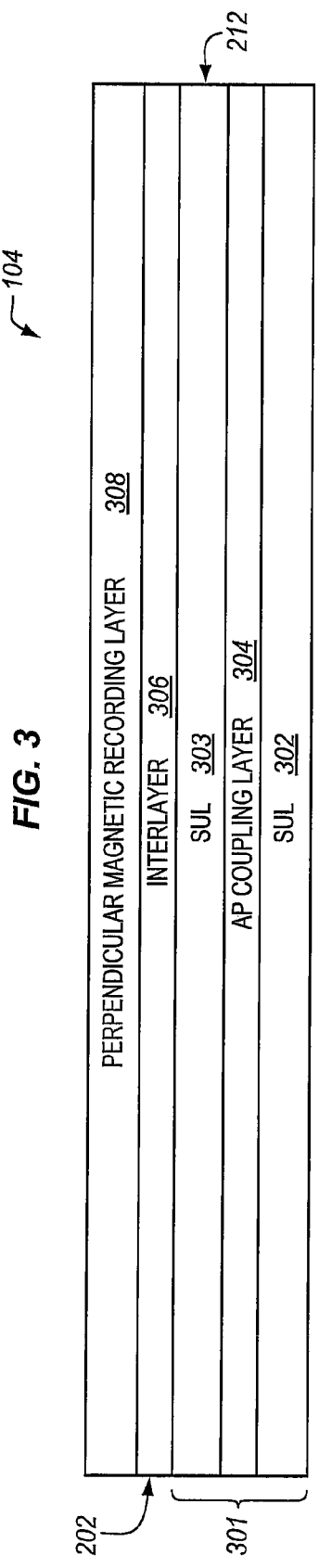
FIG. 3 is a cross-sectional view of a perpendicular magnetic recording disk in an exemplary embodiment of the invention.

FIGS. 1-8 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

FIG. 1 illustrates a magnetic disk drive system 100 in an exemplary embodiment of the invention. Magnetic disk drive system 100 includes a spindle 102, a perpendicular magnetic recording disk 104, a motor controller 106, an actuator 108, an actuator arm 110, a suspension arm 112, and a recording head 114. Spindle 102 supports and rotates perpendicular magnetic recording disk 104 in the direction indicated by the arrow. A spindle motor (not shown) rotates spindle 102 according to control signals from motor controller 106. Recording head 114 is supported by suspension arm 112 and actuator arm 110. Actuator arm 110 is connected to actuator 108 that is configured to rotate in order to position recording, head 114 over a desired track of perpendicular magnetic recording disk 104. Magnetic disk drive system 100 may include other devices, components, or systems not shown in FIG. 1. For instance, a plurality of magnetic disks, actuators, actuator arms, suspension arms, and recording heads may be used.

When perpendicular magnetic recording disk 104 rotates, an air, flow generated by the rotation of magnetic disk 104 causes an air bearing surface (ABS) of recording head 114 to ride on a cushion of air at a particular height above magnetic disk 104. The height depends on the shape of the ABS. As recording head 114 rides on the cushion of air, actuator 108 moves actuator arm 110 to position a read element (not shown) and a write element (not shown) in recording head 114 over selected tracks of perpendicular magnetic recording disk 104.

FIG. 2 is a top view of perpendicular magnetic recording disk 104 in an exemplary embodiment of the invention. Perpendicular magnetic recording disk 104 is circular in shape, and thus has an inner radius 202 and an outer radius 212. On the surface of perpendicular magnetic recording disk 104 are a plurality of concentric tracks. FIG. 2 illustrates a plurality of tracks 204 toward the inner radius 202 of perpendicular magnetic recording disk 104, which may be referred to as the inner tracks. FIG. 2 also illustrates a plurality of tracks 214 toward the outer radius 212 of perpendicular magnetic recording disk 104, which may be referred to as the outer tracks. Perpendicular magnetic recording disk 104 includes many more tracks than is illustrated in FIG. 2.

As stated in the Background, it is common for the data recording frequencies used to write to perpendicular magnetic recording disk 104 to vary depending on the circumference of the track. For instance, the recording frequency of inner tracks 204 is less than the recording frequency of outer tracks 214. The purpose of the differing recording frequencies is to have substantially similar linear density for all of the tracks of perpendicular magnetic recording disk 104. Unfortunately, the different recording frequencies cause a non-uniform MWW of the bits as written on perpendicular magnetic recording disk 104.

FIG. 3 is a cross-sectional view of perpendicular magnetic recording disk 104 in an exemplary embodiment of the invention. FIG. 3 shows half of perpendicular magnetic recording disk 104 from inner radius 202 on the left hand side of FIG. 3 to outer radius 212 on the right hand side of FIG. 3. Perpendicular magnetic recording disk 104 includes a SUL structure 301 comprised of a first SUL 302 and a second SUL 303 sandwiching an AP coupling layer 304. Perpendicular magnetic recording disk 104 further includes an interlayer 306 formed on the SUL structure 301 and a perpendicular magnetic recording layer 308 formed on interlayer 306. Perpendicular magnetic recording disk 104 may include other layers not shown in FIG. 3 for the sake of brevity, such as one or more protective layers formed on perpendicular magnetic recording layer 308, one or more seed layers, one or more layers between SUL structure 301 and interlayer 306, one or more layers between interlayer 306 and magnetic recording layer 308, etc. Also, FIG. 3 is not drawn to scale as the thicknesses and widths of the layers may be much different than is represented in FIG. 3. In other embodiments of perpendicular magnetic recording disk 104, SUL structure 301 may not be an AP coupled structure.

Perpendicular magnetic recording layer 308 comprises one or more materials that have an easy axis of magnetization oriented substantially perpendicular to the substrate. Perpendicular magnetic recording layer 308 may be formed from a Co-alloy and may include elements such as Cr and Pt as well as oxides such as $SiO_2$. Interlayer 306 controls the orientation and grain diameter of the perpendicular magnetic recording layer 308. The SUL structure 301 acts in conjunction with the write head to increase the perpendicular field magnitude and improve the field gradient generated by a recording head passing over the perpendicular magnetic recording disk 104. The first SUL 302 and the second SUL 303 may be formed from materials such as CoFeTaZr. The first SUL 302 and the second SUL 303 are antiparallel coupled across AP coupling layer 304, which may be formed from a material such as Ru.

According to embodiments provided herein, SUL structure 301 has an increased permeability from inner radius 202 of perpendicular magnetic recording disk 104 to outer radius 212. In addition to the MWW being dependent on data recording frequency, the MWW is further dependent on the permeability of the SUL structure 301 of, disk 104. Thus, to make the MWW more uniform across disk 104, the permeability of the SUL structure 301 is increased from inner radius 202 to outer radius 212.

The permeability (Bs/Hk) of a material depends on the magnetization (Ms) and the intrinsic anisotropy (Hk) of the material. In an AP coupled SUL structure 301 such as shown in FIG. 3, the permeability (Bs/Hs) of the SUL structure 301 may be controlled by changing the AP exchange field (Hex) between the first SUL 302 and the second SUL 303 across AP coupling layer 304. The AP exchange field may be changed from inner radius 202 to outer radius 212 in at least two ways as described herein. One way is to increase the thicknesses of the first SUL 302 and the second SUL 303 from inner radius 202 to outer radius 212 (see FIG. 4). Another way is to increase the thickness of AP coupling layer 304 from inner radius 202 to outer radius 212 (see FIG. 6). There may be other ways of changing the permeability of the SUL structure 301 not disclosed that are within the scope of the invention, such as a combination of the two ways described above.

Figure 4:
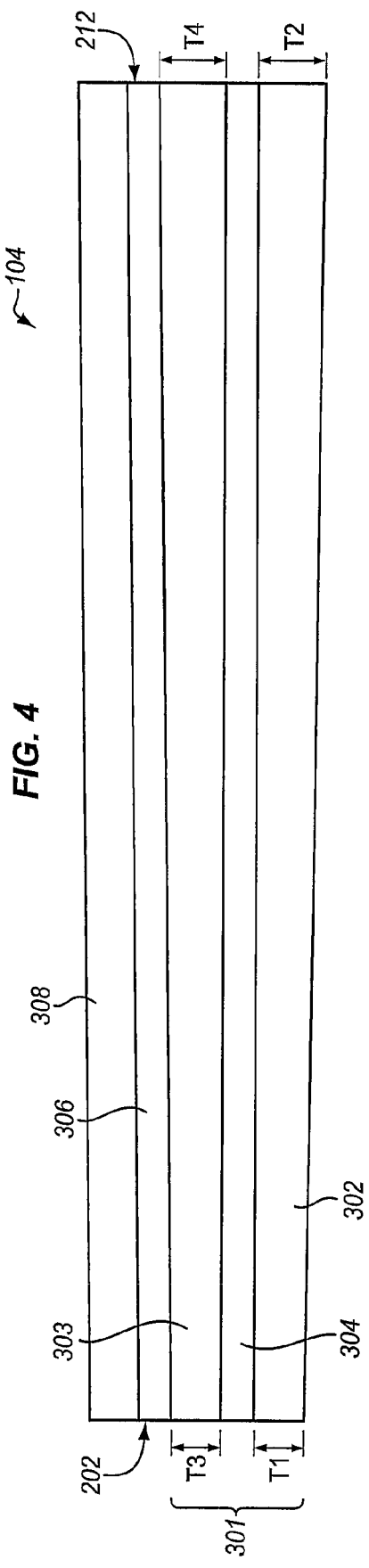
FIG. 4 is a cross-sectional view of a perpendicular magnetic recording disk with the thicknesses of a first SUL and a second SUL increasing from an inner radius of the disk to an outer radius in an exemplary embodiment of the invention.

FIG. 4 is a cross-sectional view of perpendicular magnetic recording disk 104 with the thicknesses of the first SUL 302 and the second SUL 303 increasing from inner radius 202 to outer radius 212 in an exemplary embodiment of the invention. Perpendicular magnetic recording disk 104 is formed in this embodiment such that the first SUL 302 has a first thickness (T1) at inner radius 202 and has a second thickness (T2) at outer radius 212. The second thickness (T2) is greater than the first thickness (T1). As a result, the thickness of the first SUL 302 increases from inner radius 202 to outer radius 212. The second SUL 303 has a first thickness (T3) at inner radius 202 and has a second thickness (T4) at outer radius 212. The second thickness (T4) is greater than the first thickness (T3). As a result, the thickness of the second SUL 303 increases from inner radius 202 to outer radius 212. The increase in thickness from inner radius 202 to outer radius 212 may be substantially linear as shown in FIG. 4, but a linear increase in thickness depends on fabrication tolerances. The increase in thickness from T1 to T2 and from T3 to T4 may be at least 40% which leads to about a 40% increase in permeability of the SUL structure 301 from inner radius 202 to outer radius 212. The 40% increase in permeability results in a more uniform MWW than was previously achieved.

Figure 5:
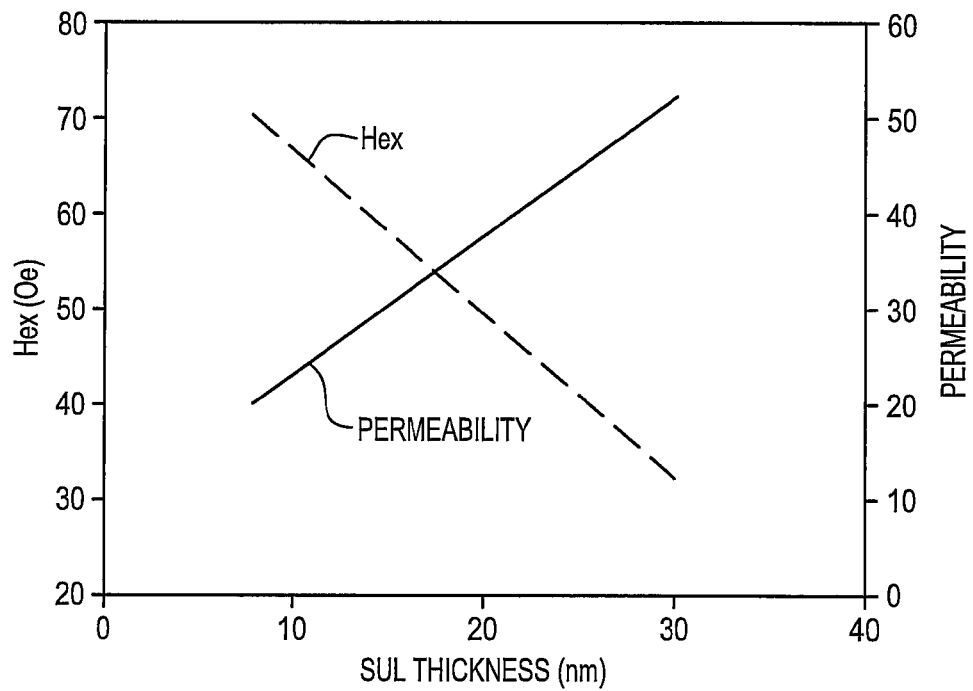
FIG. 5 is a graph illustrating the AP exchange field (Hex) and permeability of an SUL structure as a function of SUL thickness in an, exemplary embodiment of the invention.

FIG. 5 is a graph illustrating the AP exchange field (Hex) and permeability of the SUL structure 301 as a function of SUL thickness in an exemplary embodiment of the invention. The AP exchange field (Hex) depends on the constant energy (Jex) of the SUL layers 302-303 and the thickness (t) of the SUL layers 302-303 according to the following equation: Hex=Jex/Ms*t. As the thicknesses of the SUL layers 302-303 increase, the AP exchange field (Hex) decreases. Further, the permeability (Bs/Hs) of the SUL structure 301 depends on the AP exchange field (Hex) and the intrinsic anisotropy (Hk) of SUL layers 302-303 according to the following equation: permeability~Bs/(Hex+Hk). Thus, as the AP exchange field (Hex) decreases, the permeability of the SUL structure 301 increases.

As shown in FIG. 5, as the thickness of the SUL layers 302-303 increases from 10 m to 30 nm, the AP exchange field (Hex) decreases from about 65 Oe to about 30 Oe. The result of the AP exchange field (Hex) decreasing is that the permeability of the SUL structure 301 increases from about 22 to about 52. Thus, increasing the thickness of the SUL layers 302-303 as shown in FIG. 4 effectively increases the permeability of the SUL structure 301 and creates a more uniform MWW in perpendicular magnetic recording disk 104.

Figure 6:
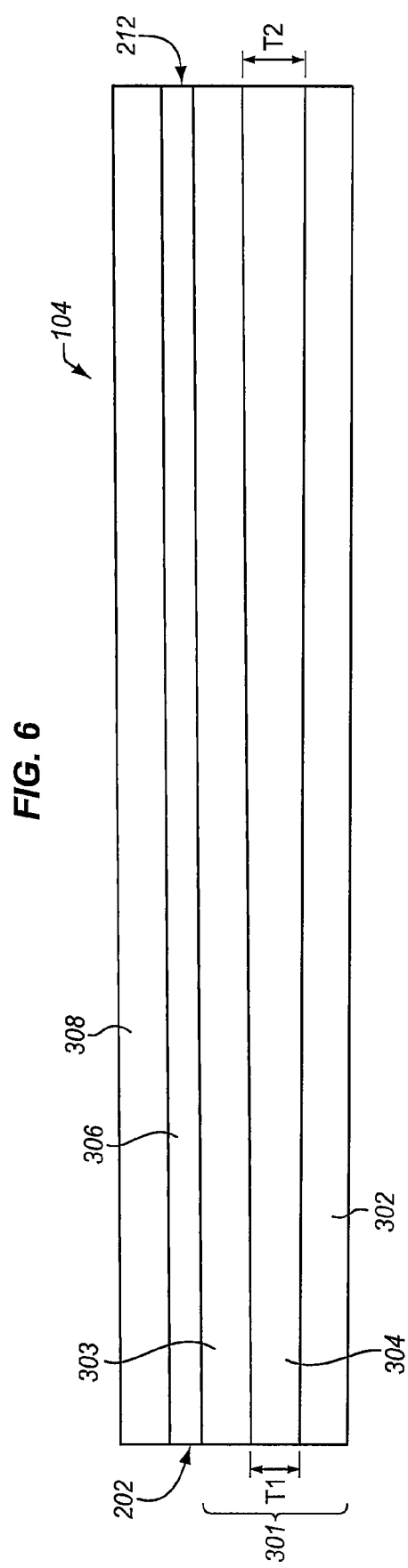
FIG. 6 is a cross-sectional view of a perpendicular magnetic recording disk with the thickness of an AP coupling layer increasing from an inner radius of the disk to an outer radius in an exemplary embodiment of the invention.

FIG. 6 is a cross-sectional view of perpendicular magnetic recording disk 104 with the thickness of AP coupling layer 304 increasing from inner radius 202 to outer radius 212 in an exemplary embodiment of the invention. Perpendicular magnetic recording disk 104 is formed in this embodiment such that AP coupling layer 304 has a first thickness (T1) at inner radius 202 and has a second thickness (T2) at outer radius 212. The second thickness (T2) is greater than the first thickness (T1). As a result, the thickness of the AP coupling layer 304 increases from inner radius 202 to outer radius 212. The increase in thickness from inner radius 202 to outer radius 212 may be substantially linear as shown in FIG. 6, but a linear increase in thickness depends on fabrication tolerances. The increase in thickness from T1 to T2 may be at least 10%.

Figure 7:
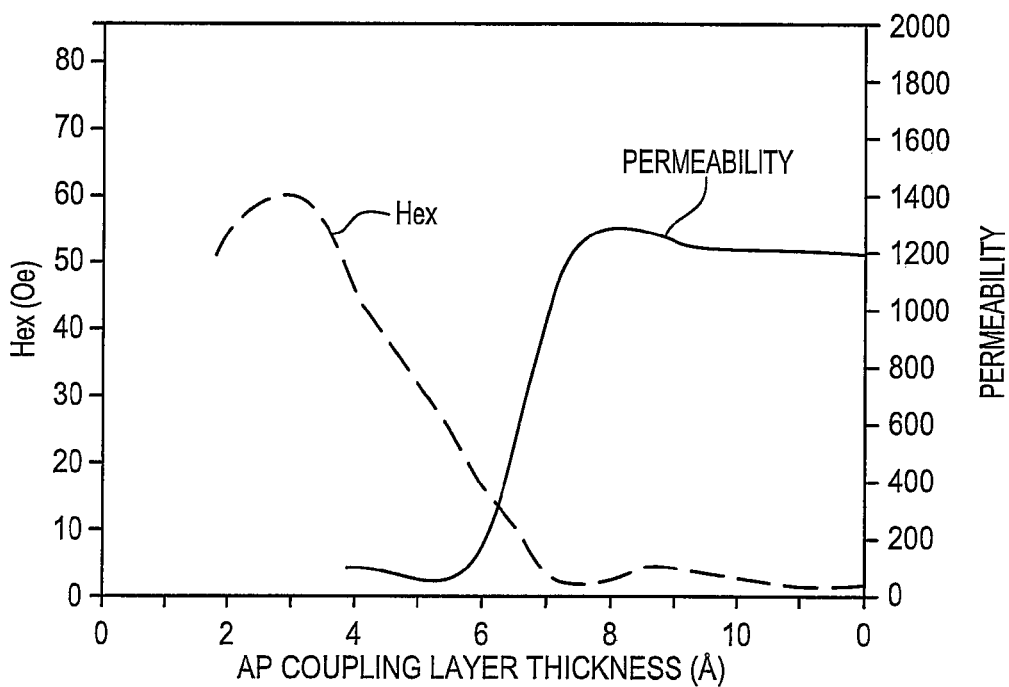
FIG. 7 is a graph illustrating the AP exchange field (Hex) and permeability of an SUL structure as a function of AP coupling layer thickness in an exemplary embodiment of the invention.

FIG. 7 is a graph illustrating the AP exchange field (Hex) and permeability of the SUL structure 301 as a function of AP coupling layer thickness in an exemplary embodiment of the invention. As the thickness of AP coupling layer 304 increases, the AP exchange field (Hex) decreases. And again, the permeability (Bs/Hs) of the SUL structure 301 depends on the AP exchange field (Hex) and the intrinsic anisotropy (Hk) of SUL layers 302-303 according to the following equation: permeability~Bs/(Hex+Hk). Thus, as the AP exchange field (Hex) decreases with the increased thickness of AP coupling layer 304, the permeability of the SUL structure 301 increases.

As shown in FIG. 7, as the thickness of AP coupling layer 304 increases from about 5 Å to about 9 Å, the AP exchange field (Hex) decreases from about 60 Oe to about 5 Oe. The result of the AP exchange field (Hex) decreasing is that the permeability of the SUL structure 301 increases from about 50 to about 1200. Thus, increasing the thickness of AP coupling layer 304 as shown in FIG. 6 effectively increases the permeability of the SUL structure 301 and creates a more uniform MWW in perpendicular magnetic recording disk 104.

FIG. 8 is a flow chart illustrating a method 800 of fabricating perpendicular magnetic recording disk 104 in an exemplary embodiment of the invention. Step 802 comprises forming first SUL 302 on a substrate (see FIG. 3). Step 804 comprises forming AP coupling layer 304 on first SUL 302. Step 806 comprises forming second SUL 303 on AP coupling layer 304. Steps 802-806 form the SUL structure 301, although other layers may also be used to form the SUL structure 301.

First SUL 302, AP coupling layer 304, and second SUL 303 are formed such that an AP exchange field between first SUL 302 and second SUL 303 decreases from inner radius 202 to outer radius 212 (see FIG. 3). SUL structure 301 thus has an increased permeability from inner radius 202 to outer radius 212. Other methods may be performed to generate an SUL structure 301 that has an increased permeability from inner radius 202 to outer radius 212.

If method 800 is used to fabricate the perpendicular magnetic recording disk 104 as shown in FIG. 4, then first SUL 302 is formed in step 802 so that the thickness of first SUL 302 increases from inner radius 202 to outer radius 212. This may be accomplished by optimizing a sputter deposition cathode and the target-to-disk substrate spacing. The sputter deposition flux from the sputter target has a cosine distribution from the erosion center which is determined by the magnet array of the cathode. By adjusting the target erosion distances and the target-to-substrate spacing, a changing thickness profile as illustrated in FIG. 4 may be achieved.

Further, second SUL 303 is formed in step 806 so that the thickness of second SUL 303 increases from inner radius 202 to outer radius 212. This may be accomplished with a similar sputter deposition process as described above.

If method 800 is used to fabricate the perpendicular magnetic recording disk 104 as shown in FIG. 6, then AP coupling layer 304 is formed in step 804 so that the thickness of AP coupling layer 304 increases from inner radius 202 to outer radius 212. This may be accomplished with a similar sputter deposition process as described above.

Step 808 comprises forming interlayer 306 on the SUL structure 301. The material for interlayer 306 may comprise NiCr, NiWCr, or a similar alloy. Step 810 comprises forming perpendicular magnetic recording layer 308 on interlayer 306. The material for the perpendicular magnetic recording layer 308 may comprise CoPtCr—SiOx or another similar material. There may be other layers of material deposited than those described in method 800.

For the specification and claims "on" means above, but not necessarily in contact with.

Although specific embodiments were described herein, the scope of the invention is not limited to those specific embodiments. The scope of the invention is defined by the following claims and any equivalents thereof.

I claim:

1. A perpendicular magnetic recording disk, comprising:
    a soft magnetic underlayer (SUL);
    an interlayer on the SUL; and
    a perpendicular magnetic recording layer on the interlayer;
    wherein the SUL has an increased permeability from an inner radius of the disk to an outer radius of the disk.

2. The perpendicular magnetic recording disk of claim 1 wherein the SUL comprises an antiparallel (AP) coupled SUL structure comprising:
    a first SUL;
    an AP coupling layer on the first SUL; and
    a second SUL on the AP coupling layer.

3. The perpendicular magnetic recording disk of claim 2 wherein the thicknesses of the first SUL and the second SUL increase from the inner radius of the disk to the outer radius of the disk.

4. The perpendicular magnetic recording disk of claim 3 wherein the thicknesses of the first SUL and the second SUL increase by at least 40% from the inner radius of the disk to the outer radius of the disk.

5. The perpendicular magnetic recording disk of claim 2 wherein the thickness of the AP coupling layer increases from the inner radius of the disk to the outer radius of the disk.

6. The perpendicular magnetic recording disk of claim 5 wherein the thickness of the AP coupling layer increases by at least 10% from the inner radius of the disk to the outer radius of the disk.

7. A perpendicular magnetic recording disk, comprising:
    a first soft magnetic underlayer (SUL);
    an antiparallel (AP) coupling layer on the first SUL;
    a second SUL on the AP coupling layer;
    an interlayer on the second SUL; and
    a perpendicular magnetic recording layer on the interlayer;
    wherein the first SUL, the AP coupling layer, and the second SUL are formed such that an AP exchange field between the first SUL and the second SUL decreases from an inner radius of the disk to an outer radius of the disk.

8. The perpendicular magnetic recording disk of claim 7 wherein the permeability of the first SUL, the AP coupling layer, and the second SUL increases from the inner radius of the disk to the outer radius of the disk.

9. The perpendicular magnetic recording disk of claim 7 wherein the thicknesses of the first SUL and the second SUL increase from the inner radius of the disk to the outer radius of the disk.

10. The perpendicular magnetic recording disk of claim 9 wherein the thicknesses of the first SUL and the second SUL increase by at least 40% from the inner radius of the disk to the outer radius of the disk.

11. The perpendicular magnetic recording disk of claim 7 wherein the thickness of the AP coupling layer increases from the inner radius of the disk to the outer radius of the disk.

12. The perpendicular magnetic recording disk of claim 11 wherein the thickness of the AP coupling layer increases by at least 10% from the inner radius of the disk to the outer radius of the disk.

13. A magnetic disk drive system, comprising:
    a recording head; and
    a perpendicular magnetic recording disk readable and writable by the recording head, the perpendicular magnetic recording disk comprising:
        a perpendicular magnetic recording layer;
        an interlayer; and
        a soft magnetic underlayer (SUL) structure;
        wherein the SUL structure has an increased permeability from an inner radius of the disk to an outer radius of the disk.

14. The magnetic disk drive system of claim 13 wherein the SUL structure comprises an antiparallel (AP) coupled SUL structure comprising:
    a first SUL;
    an AP coupling layer; and
    a second SUL.

15. The magnetic disk drive system of claim 14 wherein the thicknesses of the first SUL and the second SUL increase from the inner radius of the disk to the outer radius of the disk.

16. The magnetic disk drive system of claim 15 wherein the thicknesses of the first SUL and the second SUL increase by at least 40% from the inner radius of the disk to the outer radius of the disk.

17. The magnetic disk drive system of claim 14 wherein the thickness of the AP coupling layer increases from the inner radius of the disk to the outer radius of the disk.

18. The magnetic disk drive system of claim 17 wherein the thickness of the AP coupling layer increases by at least 10% from the inner radius of the disk to the outer radius of the disk.

19. A method of fabricating a perpendicular magnetic recording disk, the method comprising:
    forming a soft magnetic underlayer (SUL);
    forming an interlayer on the SUL; and
    forming a perpendicular magnetic recording layer on the interlayer;
    wherein the SUL has an increased permeability from an inner radius of the disk to an outer radius of the disk.

20. The method of claim 19 wherein forming an SUL comprises:
    forming a first SUL;
    forming an antiparallel (AP) coupling layer on the first SUL; and
    forming a second SUL on the AP coupling layer.

21. The method of claim 20 wherein the thicknesses of the first SUL and the second SUL increase from the inner radius of the disk to the outer radius of the disk.

22. The method of claim 20 wherein the thickness of the AP coupling layer increases from the inner radius of the disk to the outer radius of the disk.

23. A method of fabricating a perpendicular magnetic recording disk, the method comprising:
    forming a first soft magnetic underlayer (SUL);
    forming an antiparallel (AP) coupling layer on the first SUL; and
    forming a second SUL on the AP coupling layer;
    wherein the first SUL, the AP coupling layer, and the second SUL are formed such that an AP exchange field between the first SUL and the second SUL decreases from an inner radius of the disk to an outer radius of the disk.

24. The method of claim 23 wherein the thicknesses of the first SUL and the second SUL increase by at least 40% from the inner radius of the disk to the outer radius of the disk.

25. The method of claim 23 wherein the thickness of the AP coupling layer increases by at least 10% from the inner radius of the disk to the outer radius of the disk.

* * * * *